United States Patent [19]

Harvey

[11] 4,151,693
[45] May 1, 1979

[54] REFRACTORY/INSULATING MODULES AND METHOD OF MAKING SAME

[75] Inventor: Barrie J. Harvey, Tyldsley, England

[73] Assignee: M. H. Detrick Co., Limited, London, England

[21] Appl. No.: 826,863

[22] Filed: Aug. 22, 1977

Related U.S. Application Data

[63] Continuation-in-part of Ser. No. 663,705, Mar. 4, 1976, abandoned.

[30] Foreign Application Priority Data

Mar. 7, 1975 [GB] United Kingdom ............... 9680/75

[51] Int. Cl.$^2$ .............................................. E04B 2/10
[52] U.S. Cl. ................................... 52/405; 52/612; 52/483
[58] Field of Search ............... 52/612, 415, 483, 608, 52/609, 409

[56] References Cited

U.S. PATENT DOCUMENTS

| 1,891,604 | 12/1932 | Peiler ..................................... 52/483 |
| 2,170,165 | 8/1939 | Strong ................................... 52/405 |
| 3,336,716 | 8/1967 | Scheppers ............................. 52/612 |

FOREIGN PATENT DOCUMENTS

| 143078 | 8/1951 | Australia ................................. 52/612 |
| 538352 | 1/1956 | Italy ........................................ 52/612 |
| 755313 | 8/1956 | United Kingdom .................... 52/612 |

OTHER PUBLICATIONS

Text: Refractories, A Publication of the General Refractories Co., Philadelphia, 1949, pp. 166–168.

*Primary Examiner*—James L. Ridgill, Jr.
*Attorney, Agent, or Firm*—Wenderoth, Lind & Ponack

[57] ABSTRACT

A refractory and insulating module for use in lining a furnace or other high temperature enclosure comprises a block having a front wall and side walls the outer faces of which side walls are inclined inward from front to back of the block, the rear of the block being open to provide a cavity. The front face of the front wall of the block is of lower density than the rear face of the front wall. The block is produced from a ceramic fiber slurry using a suction technique in conjunction with a mould shell which forms every face of the block except the front (hot) face of the front wall, the shell being formed with multiple apertures. The rear cavity may accommodate layers of other insulating materials according to the temperatures to be withstood and the temperature gradient to be achieved. The block can be secured to a furnace casing by means of fastening elements which are pushed into the outer sides of the side walls of the block. Adjoining blocks are sealed with respect to each other by a sealing fabric nipped between the edges of the front faces of the blocks.

24 Claims, 11 Drawing Figures

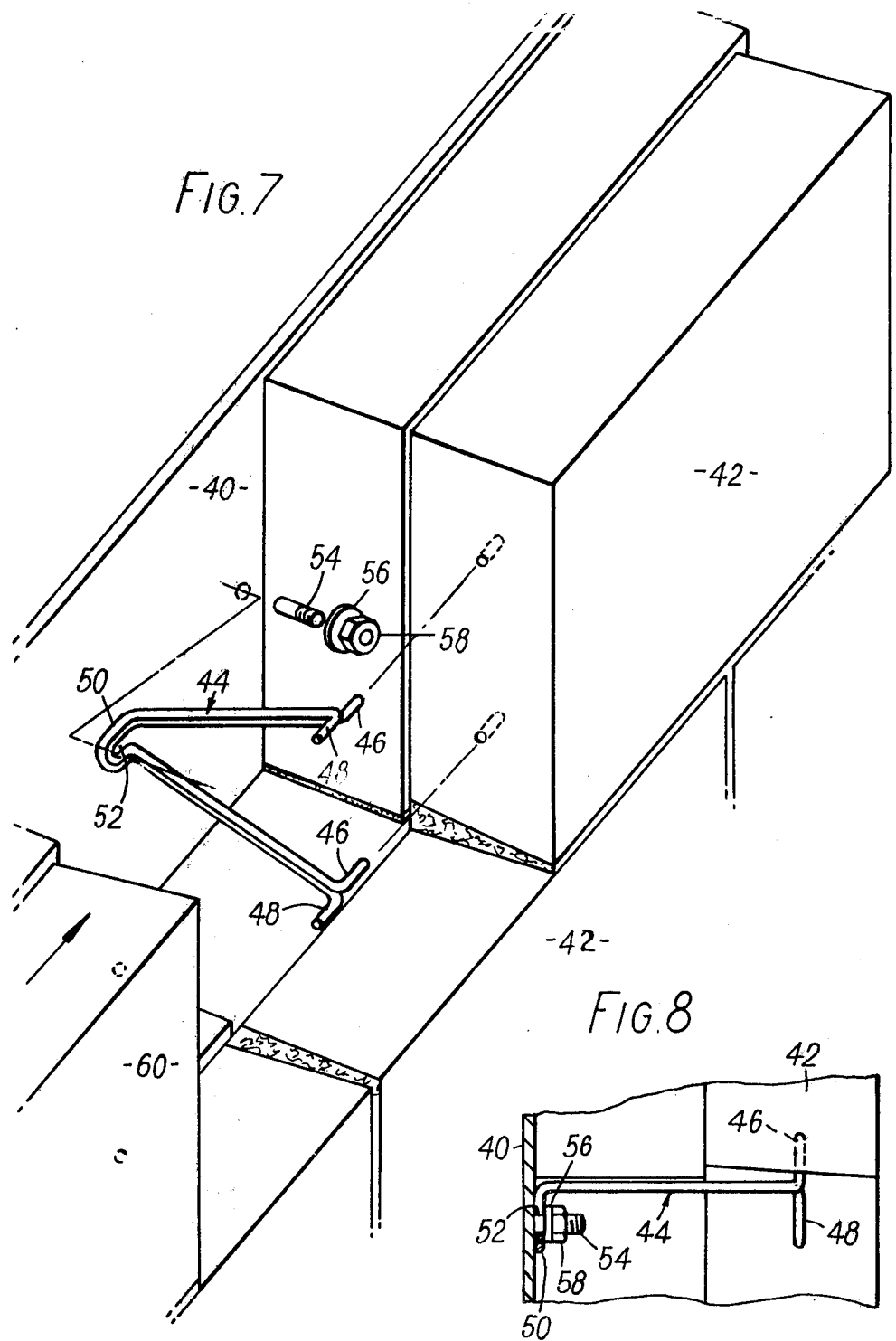

REFRACTORY/INSULATING MODULES AND METHOD OF MAKING SAME

This application is a continuation-in-part of our application Ser. No. 663,705 filed Mar. 4, 1976, now abandoned and the invention concerns refractory/insulating modules for use in lining high temperature enclosures.

Such enclosures may take the form of ducts, ovens, kilns, various types of furnace and so on, but will, for the sake of convenience, be hereafter referred to as furnaces. Such modules are of necessity constructed of material which is refractory in the sense that the material is capable of withstanding without deterioration the temperature at which it is to be exposed, and that such material must also act as a heat insulator. Accordingly where reference is made hereinafter to insulating materials it is to be understood that such material is also refractory at the temperature at which it is required to operate.

THE PRIOR ART

Conventionally refractory furnace linings are constructed from refractory bricks or monolithic refractory. These linings are very heavy and consequently require substantial foundations and supporting structures. Furthermore such furnace linings have a considerable thermal capacity which means that they take a long time to cool off after use—it is commonly several days before it is possible to enter a furnace that has been shut down. As a corollary it takes a considerable length of time and the input of a considerable amount of heat to bring such a furnace to a condition in which it can be used. Furnace linings expand and contract with rise and fall of temperature, and the design of the lining has to be such as to accommodate this.

In recent times refractory fibres, generally known as ceramic fibres, have been developed which have very good refractory properties. Such ceramic fibres are usually formed of an aluminum silicate and are commercially available in different grades according to the desired maximum operating temperature. For example fibres containing some 43-55% alumina and 42-54% silica are suitable for use up to 1260° C. while by increasing the alumina content up to 60-62% at the expense of the silica the fibres are suitable for use up to 1400° C. More recently ceramic fibres have become available which are based on almost pure alumina or zirconia and can be used at temperatures up to 1600° C. Since bodies made from such ceramic fibres may have low mass to volume ratios and have a low thermal capacity and negligible thermal expansion they are very suitable for use as furnace linings and have been so used in the form of blanket, felt or board. However, blanket, felt and board are subject to the considerable disadvantage of thermal shrinkage while blanket and felt have the further disadvantage that they present a soft easily eroded face to abrasive gases. The material is usually placed in layers on the inner surface of the steel external casing of the furnace. In order to secure these layers to the casing, studs are first welded to the casing where either the quality of the weld cannot be inspected or the stud has to protrude through the lining to the hot face, where it is subject to oxidation and corrosion.

It has also been proposed to use ceramic fibres to form solid low density modules which may be used to build up a furnace lining, but hitherto, problems connected with the shrinkage of such modules which occurs on first firing to any given temperature above about 800° C. have led to rapid failure of furnace linings made from such modules because it has proved impossible to provide between adjacent modules a refractory sealing material capable of accommodating the shrinkage and giving an acceptable life span to the new lining.

The present invention is concerned with providing an improved module which not only uses the relatively expensive ceramic fibre material in a more efficient manner but which can also be adapted to provide for differing conditions of use both as regards the hot face temperature and as regards the temperature gradient required between the hot and cold faces. The term hot face as used herein means that face of the module which is exposed to furnace temperature, whilst a cold face is a face of the module not exposed to furnace temperature.

According to the present invention the improved refractory/insulating module comprises a hollow block moulded in one piece from ceramic fibre and being open at the back thereof, said block having a front wall the front face of which constitutes the hot face, and side walls the outer side surface of each of which is inclined inwardly from front to back of the block, and the front wall having a lesser density at its front face than at its rear face.

The elementary module of this invention which is preferably moulded by vacuum forming, thus consists of a hollow box of which the front wall, which provides the hot face, and the side walls are formed integrally of ceramic fibres. In order to provide control of the temperature gradient between the front and rear faces of the module the hollow interior of the module may be treated in various ways. Thus the interior may be filled with suitable insulating material, for example, in particulate or foamed condition. Conveniently the elementary module may be provided with a back wall which acts as a closure. Such back wall or closure may be a board of ceramic fibre or a different and lower grade insulating material. The space so enclosed may be filled with insulating material, for example in particulate form. Alternatively the enclosed space may be split up into a plurality of air spaces by means of one or more inter-layers which extend between the side walls and parallel to the front wall. Such inter-layers may consist of ceramic fibre board, vermiculite board or other insulating board, used either singly or in selected combinations depending on requirements. One or more of the air spaces so formed may also contain insulating material. Since a substantial part of the heat is transmitted by radiation it is convenient if at least some of the insulating material contains a substance such as rutile which acts to reduce the transmission of heat by radiation.

The module according to the invention may have attached to the rear of the block a body of lower grade insulating material such as mineral wool or calcium silicate, forming a back wall of the module.

The invention will now be described in more detail with reference by way of example to the accompanying drawings in which:

FIGS. 7 and 8 are respectively a perspective view and a plan illustrating one method of fixing the modules of this invention.

Figure 1:
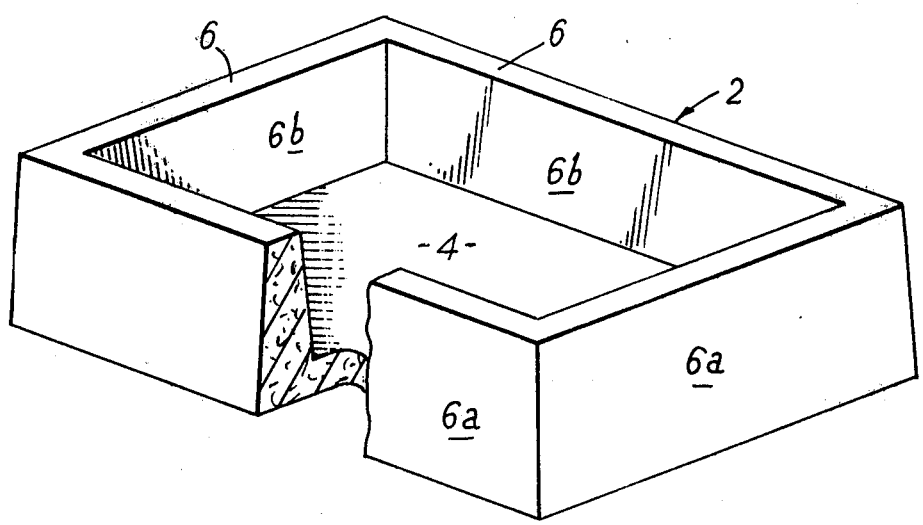
FIG. 1 is a perspective view partly in section of an elementary module of this invention.

Referring to FIG. 1, a module is shown which embodies the invention. The module is in the form of a hollow block open at the back, to provide a front wall 4 and a peripheral skirt constituted by four side walls 6. As the block is shown in FIG. 1 the undersurface of the front wall 4 is the hot face, i.e., the face exposed to the direct heat of the furnace.

The outer side surface 6a of each of the four side walls 6 is inclined inwardly from the front to the back of the block. By reason of the mode of manufacture of the block, to be described in more detail below, the hot face of the front wall 4 has a lower density than the cold face of that wall and indeed than any other face of the block. For convenience in manufacture the inner surface 6b of the side walls 6 is slightly inclined outwards from front to back of the block so that the thickness of each side wall reduces towards its back edge. This elementary module may be used as such or its insulating properties may be improved by filling the hollow bounded by the front wall 4 and side walls 6 with additional insulating material. Such material may for example be loose bulk ceramic fibre, ceramic fibre blanket with or without a suitable binding agent or a foamed refractory which initially consists of a slurry of ceramic fibres with the addition of binding and foaming agents and which sets on drying.

Figure 2:
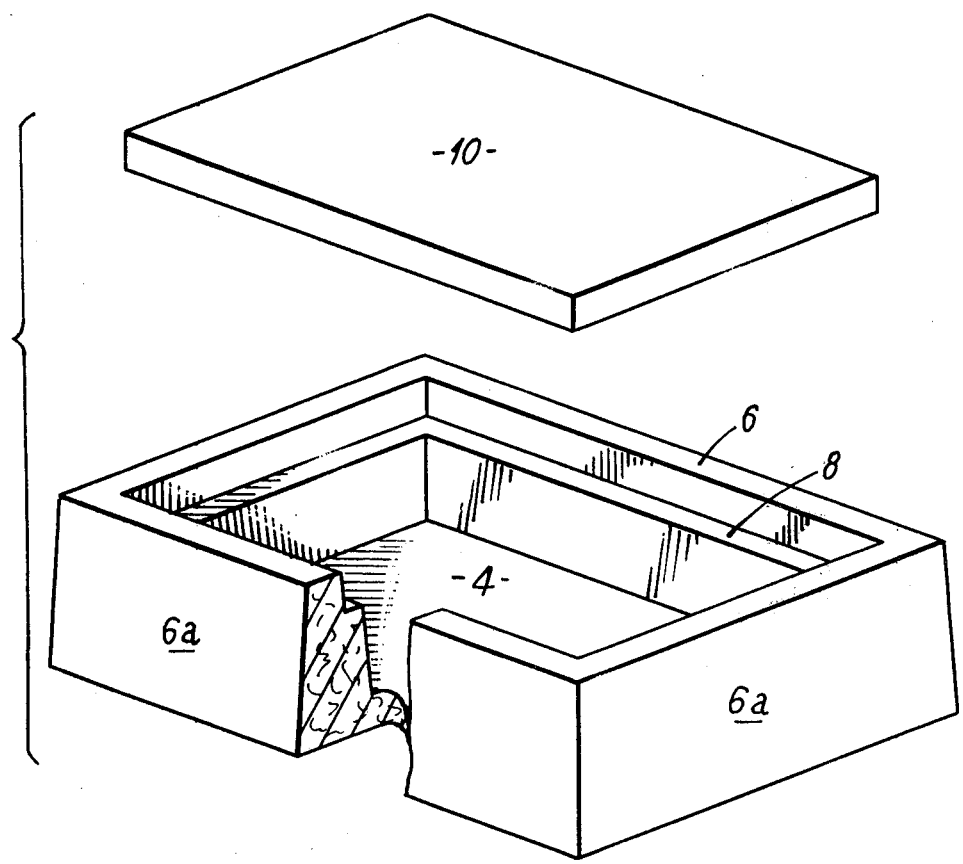
FIG. 2 is an exploded view partly in section of a module having a back wall.

FIG. 2 shows a modification of the module of FIG. 1. Here the thickness of the side walls 6 is sharply reduced at the outer ends to form a step 8 which provides a seat for a back wall 10. This may consist of a board of ceramic fibre or other suitable refractory/insulating material and it may be secured in position by means of a suitable refractory cement. The space enclosed between the front, side and back walls may be left empty, or according to the required duty, the space may be filled with suitable refractory/insulating material or may be divided so as to form one or more air gaps which extend parallel to the hot face.

Figure 3:
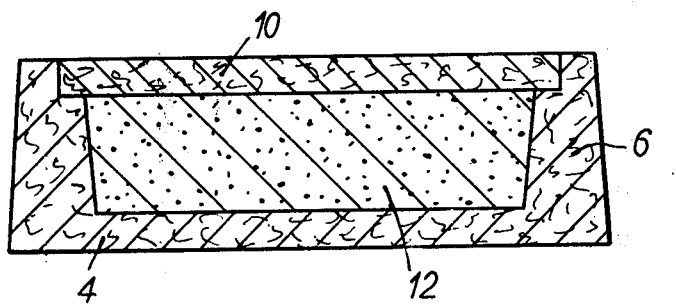
FIG. 3 is a sectional view of the module of FIG. 2 after completion.

FIG. 3 is a sectional view of the module of FIG. 2 showing the space enclosed between the front wall 4, the side walls 6, and the back wall 10 filled with an insulating material 12 which may be in any of the forms mentioned herein.

Figure 4:
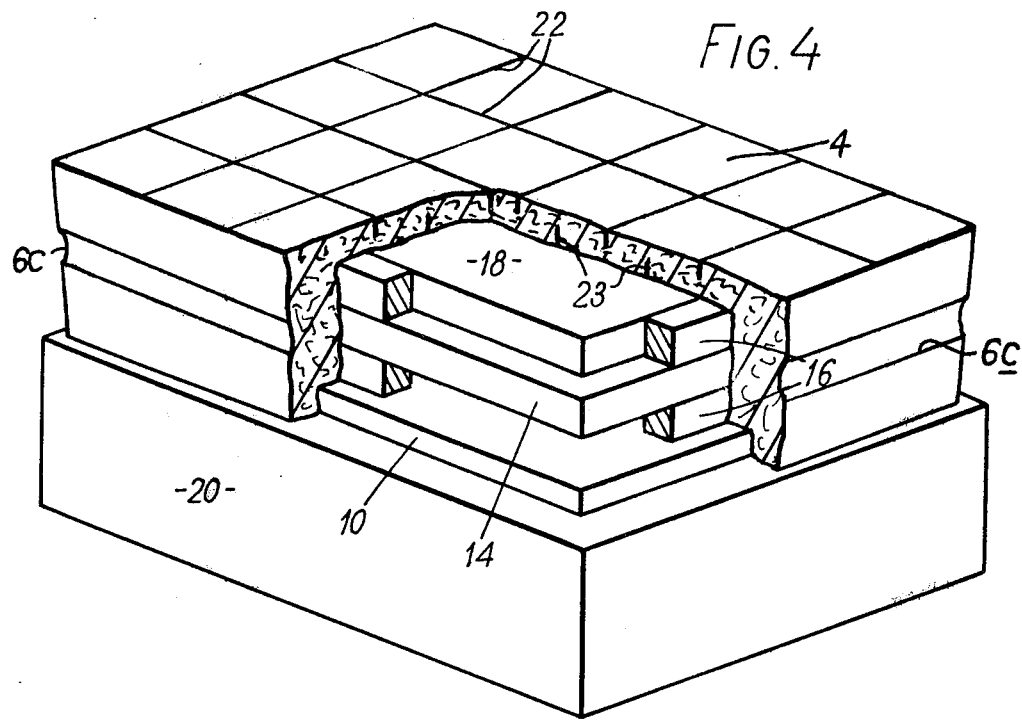
FIG. 4 is a perspective view of a completed module, a part thereof being cut away to show the internal arrangement.

FIG. 4 shows one form of a completed module according to this invention which comprises the block of FIG. 2 having back wall 10 and in which an inter-layer or board 14 is secured between the back wall 10 and the inner surface of the front wall 4 by fillets 16. The space between the board 14 and the back wall 10 is left open to provide an air gap while the space between the board 14 and the inner face of the front wall 4 is filled with a suitable insulating body 18. The illustrated module is also shown as having a body 20 of lower grade refractory material, such as mineral wool, secured on its rear face.

In the module of FIG. 4 a shallow arcuate-section groove 6c is shown extending along the outer face of each side of the block, and is spaced from the hot face.

As mentioned above ceramic fibre materials tend to shrink when heated and at temperatures which come into question this shrinkage can in an aggravated case amount to 4%. Such shrinkage is undesirable since it can lead to gaps occurring between juxtaposed modules which can expose the casing of a furnace to the high temperature gases therein. It has been found that the effects of such shrinkage can be reduced if as is illustrated in FIG. 4 the hot face of the module is formed with a grid of grooves 22 spaced apart by about 10 cms which may be cut by means of a saw or may be formed during the manufacture of the module as described below. The grooves 22 may have a depth which is somewhat greater than one half the thickness of the front wall 4. In addition the inner face of the front wall may also be provided with a similar grid of grooves 23 which preferably continue down at least part of the inner surface of the side walls 6, the grooves in the outer and inner faces being staggered as shown. However, using the method of manufacture of the modules described herein these grooves are usually unnecessary. Alternatively, or in addition, it may be expedient (for example for lining a furnace roof) to form the front wall 4 so that it is somewhat bowed inwardly, the hot and cold faces of this wall thus being concave and convex respectively.

Figure 5:
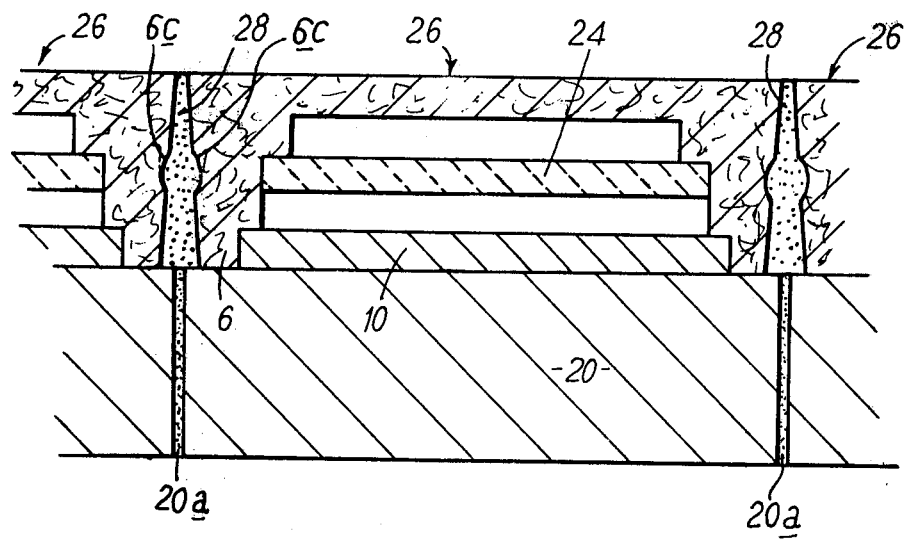
FIG. 5 is a sectional view of another form of completed module shown juxtaposed to adjacent modules.

FIG. 5 illustrates a modification of the module of FIG. 4 in which an inter-layer or board 24 is seated on a step formed in the side walls 6 and there is an air gap left on either side of the board. In this construction it is preferred that the board 24 shall be constructed of a material which acts as a barrier for radiant heat.

It will be appreciated that the various parts of the modules illustrated in FIGS. 2, 3, 4 and 5 may be secured as required by the use of a suitable refractory cement.

FIG. 5 also illustrates three modules 26 juxtaposed side to side in the position they occupy in a complete furnace lining. Each module is also shown as being provided with a block 20 of lower grade refractory material on its rear face as described with reference to FIG. 4.

In order to prevent the flow of hot gases through the joints between the modules when the modules shrink, a packing 28 of ceramic fibre is arranged between the sides of adjacent modules. Such packing preferably takes the form of a strip of ceramic fibre blanket which is arranged under moderate pressure between the modules. Alternatively the packing may take the form of a wedge shaped piece of resin bonded ceramic fibre. In such material the bond will be destroyed at furnace temperature when the fibres will take up several times their bonded volume. In either case the inherent resilience of the packing will ensure a sound joint despite shrinkage of the modules and the expansion of the packing into the groove 6c in the side face of the block assists in providing a good seal. A further band of packing material 20a is disposed between adjacent blocks 20. This packing material 20a can conveniently be of a lower grade than the packing 28. Furthermore it is not so necessary, owing to the lower temperature at the blocks 20, that the packing 20a should be so tightly compressed. As is mentioned below, the sealing packing 28 and 20a can conveniently be provided adherent to two adjacent faces of each complete module.

In some circumstances, particularly in the case of large modules, it may be convenient to shape the outer faces of the side walls 6, in the manner known for conventional refractory blocks, so as to produce a treaded or ship-lapped joint between adjacent modules.

Figure 6:
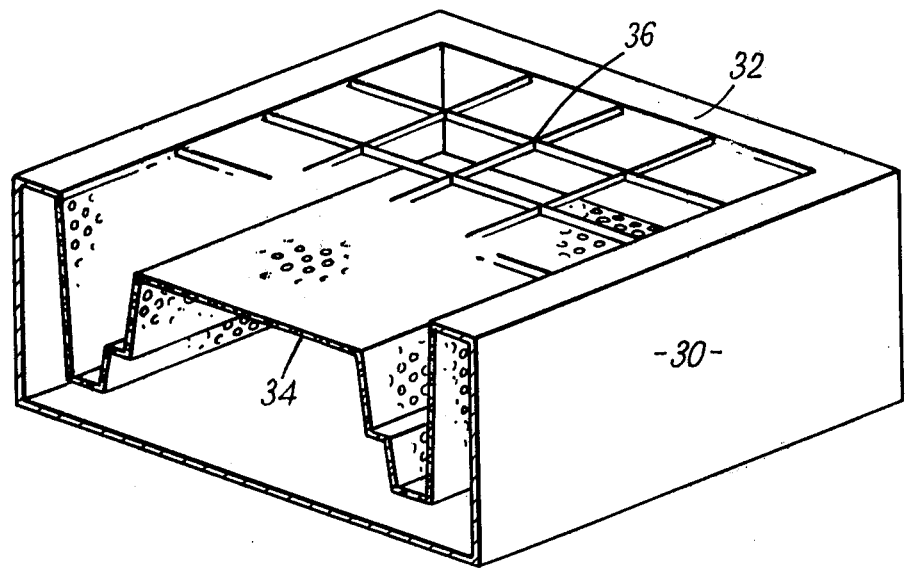
FIG. 6 is a diagrammatic sectional view in perspective showing one form of mould for use in making the elementary module.

The module is manufactured by a vacuum forming process in which a suitably shaped mould having at least the major part of its surface perforated or otherwise made permeable is connected to a suction line and then dipped into a slurry of short staple ceramic fibres. Suction is maintained until a sufficient thickness of fibre has been built up. The body is then removed from the mould and dried in circulating air at about 150° C. Conveniently the slurry may include suitable binding materials such as starch together with colloidal silica or boehmite. The density of the completed module is preferably of the order of from 15–18 lbs/cu.ft. although somewhat higher densities may be used if the corresponding falling off in insulating value is acceptable. A mould by means of which the block shown in FIG. 1 is made is illustrated in FIG. 6. As shown this mould comprises a tray 30 having at its open end inturned flanged 32 to the edges of which the periphery of a form 34 is secured. This form is made of finely perforated brass sheet and has the shape of the module to be made, in that the mould defines the shape of every face of the block except the hot face of the front wall 4. The interior of the tray is connected by a hose, not shown, to a suction line. In use suction is continued until ceramic fibre builds up to the level of the flanges 32. It will be noted that this mode of manufacturing the block builds up from back to front so that all the external faces of the block except the hot face of the front wall 4 are shaped by the mould. In consequence the ceramic fibre at all the external surface portions of the block has a greater density than the hot face of the front wall, which face is the last to be formed. Although this "reverse" method of moulding the block gives the front wall a hot face which is somewhat rough-textured, the method imparts to the block advantages which are very important to its functions. These advantages are as follows:

1. The resulting block has a low density hot face.
2. Since the hollow back and side surfaces of the block are moulded first, the slurry gradually building up within the mould to the level of the hot face of the block, the required plane of the hot face coincides with the plane of the flange 32 and it can therefore be determined accurately when the front wall of the block has attained the correct and even thickness.
3. The provision of the inclined outer surfaces 6a of the block is obtained without the necessity to use a multi-part mould.
4. The block has relatively high density outer side surfaces 6a.
5. The rear face of the front wall 4 and all the internal faces defining the hollow of the block are accurately formed.

The importance of these advantages will become apparent.

If it is desired to form the hot face of the module with a grid of grooves, see the grooves 22 in FIG. 4, this may be achieved during the vacuum forming operation by arranging a lattice 36 constructed of metal strip in the open end of the tray 30. The lattice is removably secured to or hinged to the flanges 32 by means not shown so that after the module has been formed the lattice can move from the position shown to allow the module to be removed from the mould. The grooves 23 of FIG. 4 may be formed by securing a similar lattice on the face of the form 34.

The groove 6c shown in FIGS. 4 and 5 is (when provided) formed in a subsequent operation.

It will be appreciated that when vacuum forming the modules of this invention the nature or grade of the ceramic fibres used in the slurry will be selected having regard to the intended use of the modules. Thus regard will be had to the working temperature of a furnace and to the physical and chemical conditions of its atmosphere and low or high grade ceramic fibres or mixtures of such grades will be selected in order to provide a module which is best suited to meet such conditions.

The modules of this invention are used to build up a furnace lining in the manner of bricks and are conveniently attached to the furnace supporting structure.

The high density of the material on the back and side surfaces of the block, and the low density on the hot face are very important for several reasons. A permanent shrinkage occurs when the blocks are heated to any given temperature above about 800° C., and any subsequent temperature fluctuations below the given temperature are accompanied by normal, but very small, expansion and contraction. If the previous given temperature is exceeded, further permanent shrinkage will occur, and so on. The shrinkage is most severe when the material is densest and is potentially a serious problem because if the seal between blocks is broken, rapid break-up of the wall ensues. By making the material less dense at the hot face, the fibres there are enabled to move relative to each other sufficiently to accommodate shrinkage without the face breaking up, and the denser but cooler material behind the hot face assists in holding the front wall intact. Thus by making the hot face the least dense, shrinkage of the dimensions of the hot face is minimised. The taper on the sides of the block enables a tight seal to be obtained initially without using special equipment, because it is easier to nip a sealing blanket between two front edges of adjacent blocks than across the whole thickness of the blocks, as would be the case if the blocks were parallel-sided. Thus the tightest nip on the sealing blanket occurs at the hot face where shrinkage tends to be at its greatest. The pressing together of the blocks to nip the sealing blanket at the hot face of the blocks in this way produces a small area of initial compression in the blocks in the region of the nip, and this compression is relieved by the shrinkage which occurs when the blocks come into use but nevertheless assists in maintaining the seal at the hot face. The reduction of temperature from front to back of the block means that although the corresponding surfaces if the block are relatively dense the permanent shrinkage is less and allows the seal to be maintained intact.

The importance of maintaining the accuracy of the thickness of the front wall of the block (the second of the advantages listed above) is that if the front wall is below its design thickness the temperature at the rear face of that wall is higher than it should be, so that any supplementary sheet of insulating material which is disposed in the cavity of the block is subjected to a higher temperature than it should be. An error of 100° C. in the temperature drop across the hot wall is a large error even at these elevated temperatures, since an excess temperature of 100° C. can lead to failure of an insulating material which at the proper design temperature works extremely well. The use of a block which is accurately formed thus allows cheaper insulating materials to be used in the cavity than would otherwise be the case because less allowance has to be made for the possibility of error in the temperatures at which the material will be required to operate.

The accuracy of the shape of the rear hollow in the block, particularly where steps or rebates are formed to receive layers of supplementary insulating material, enables the layers to be cut or moulded elsewhere, for example on a mass pdocution basis.

The low weight of the module permits the use of improved methods of attachment and such methods are described below.

Referring to FIGS. 7 and 8 there is shown a furnace casing 40 to which a module 42 is being secured, the lower course of modules 44 having already been secured. These modules are shown as having a block of lower grade insulating material secured on their cold faces as described with reference to the modules of FIGS. 4 and 5. The attachment means consists of a V shape member 44, conveniently formed of two wires welded together, providing oppositely directed spikes 46,48 at its free ends, and at the apex a foot 50 extending at right angles to the plane containing the arms of the V and formed to provide a slot 52. A threaded stud 54 is welded to the casing 40 in known manner and the member 44 with its foot 50 pressed against the casing 40 is advanced towards the module 42 so that the slot 52 engages the studs 54 and the spikes 46 are pressed into the side of this module. Finally a washer 56 is passed over the stud 54 and a nut 58 screwed thereon, the assembly then being as shown in FIG. 8. Instead of a threaded stud a plain stud and co-operating speed nut or a stud having an integral collar may be used. Thereafter the next module to be secured, the module 60, is advanced in the direction of the arrow towards the module 42 and impaled on the spikes 48, and the other side of the module 60 is then secured by the use of a member 44 in the manner already described.

Figure 9:
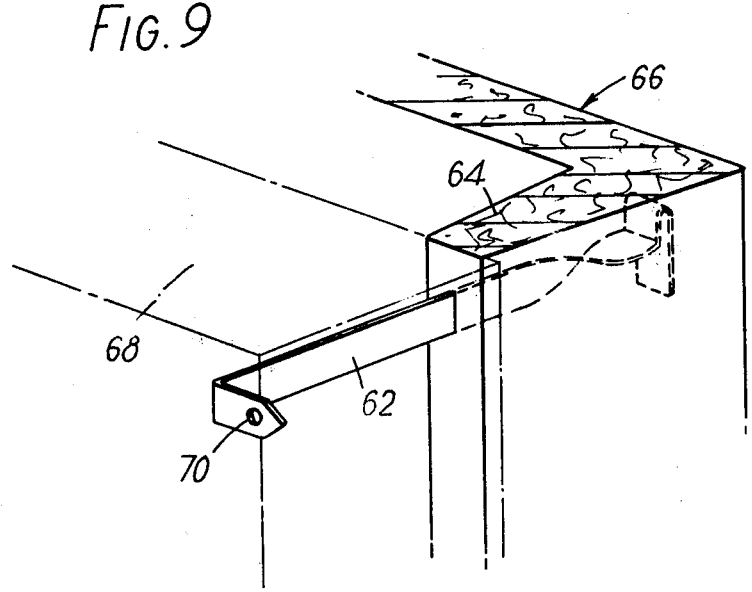
FIG. 9 is a perspective view illustrating another method of fixing the modules of this invention.

In the alternative method of attachment shown in FIG. 9 one end of a strip 62, conveniently of stainless steel, is embedded in a side wall 64 of a module 66 during its manufacture. As shown the strip 62 emerges from the end of the side wall and is then threaded through a slot in a block 68 of lower grade insulating material secured on the cold face of the module 66. The free end of the strip is then bent over at right angles and so as to extend away from the edge of the block. The extreme end of the strip is formed with an aperture 70 through which a stud is passed and welded to the furnace casing (not shown) in the manner described with reference to FIGS. 7 and 8.

Figure 10:
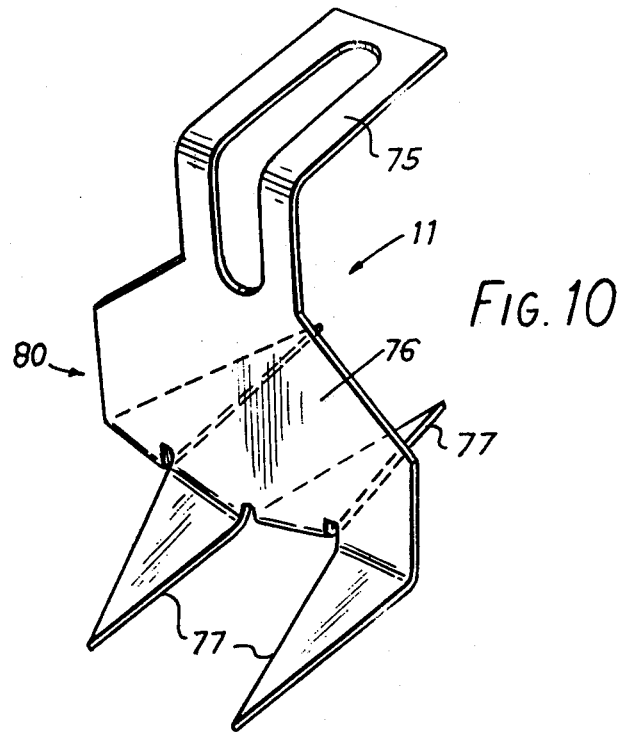
FIG. 10 is a perspective view of a further form of fastening for the modules.
Figure 11:
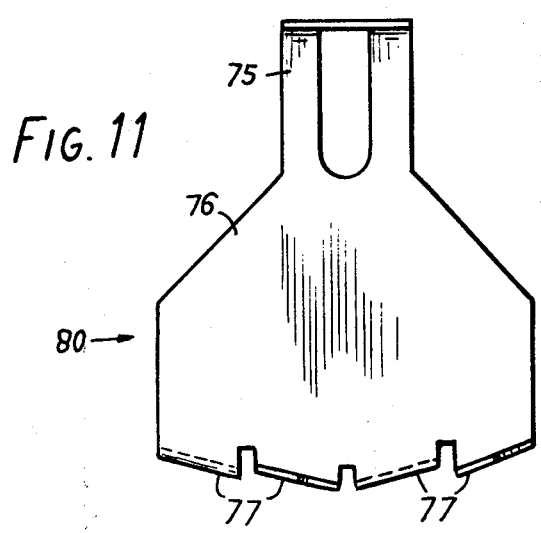
FIG. 11 is a front view of the fastening of FIG. 10 viewed in the direction of the arrow 11.

A particularly advantageous form of fastening 80 for adjoining faces of two blocks is shown in FIGS. 10 and 11. The fastening is made from sheet metal and has a slotted portion 75 which is bent into the form of a right angle and which is attachable to the head of a stud welded to the external casing of the furnace as in FIGS. 7 and 8. The body 76 of the fastening has at its end opposite the portion 75 four sharp triangular tongues 77 for pressing into the side faces of the two blocks. The tongues project two on each side of the body, and the two tongues on each side of the body are disposed in respective planes which extend at an angle to each other so that the two tongues do not jointly create a single plane of splitting in the side wall of the block. At the elevated temperatures existing where the tongues are bent outward from the body, softening of the metal of the fastening can lead to a tendency for the bends to straighten, particularly in the case of modules lining a furnace roof, where the tongues bear the full weight of the modules. By inclining the line of the bend between each tongue and the body to the plane of the hot front face of the blocks, the forces tending to straighten the bend act an an angle inclined to the plane of the tongue and have an appropriately reduced capacity to straighten the bend, and the fastening is effectively strengthened without using any more metal.

The higher the density on the side faces of the blocks provides a good anchorage for the fastenings. At the same time, the relatively soft nature of the block enables the fastenings to be put anywhere round the sides of the blocks so that the studs by which the fastenings are secured to the outer steel casing of the furnace can be placed so as to avoid welding them to rusty or otherwise obviously defective areas on the casing. Furthermore, by virtue of the position of the fastenings at the edges of the block each weld can be inspected as it is made, the welding of the stud to the furnace casing being carried out in the full sight of the operator.

Although the modules of this invention are shown as having a hot face which is rectangular this face may be square or in some circumstances triangular or even hexagonal.

From the foregoing it will be appreciated that the refractory/insulating module of this invention is very versatile since a given size of the elementary module can be adapted for different duties by selection of appropriate materials within the cavity of the block and behind the block. Also it is possible to prefabricate large numbers of modules for a particular application, each block being equipped (according to its intended use) with the appropriate further insulating materials within its rear cavity, with a backing block of a further insulating material (as shown in FIGS. 4 and 5), such as rock wool, secured by a temporary adhesive to the rear face of the block, and with a sealing layer of insulating blanket secured by a temporary adhesive on two adjacent faces of the block. The prefabricated modules can then be assembled on the inner face of the casing with a minimum of tools and special equipment, the two side surfaces of each block covered with sealing blanket being placed to co-operate with uncovered faces of adjoining blocks. Where necessary, for example to fit round a pipe the modules can easily be sawn or cut.

The light weight and improved insulating properties of the modules of this invention also make it possible to consider the redesign of furnaces and other enclosures with a view to greatly reducing the heavy support structure and foundation normally used, or providing instead a light framework intended primarily as a support for the modules.

I claim:

1. A refractory and insulating module comprising a hollow block moulded in one piece from ceramic fibre and being open at the back thereof, said block having a front wall, the front face of which constitutes the hot face, and side walls the outer side surface of each of which is inclined inwardly from front to back of the block, and the front wall having a lesser density at its front face than at its rear face.

2. A module as claimed in claim 1 in which the ceramic fibre block is made by a vacuum forming process.

3. A module as claimed in claim 1, wherein a second block of a refractory material of lower grade is secured to the back of the first said block.

4. A module as claimed in claim 1 wherein a shallow groove extends along the outer face of each side of the block, said groove being spaced from the front hot face of the block.

5. A module as claimed in claim 1 in which the hollow bounded by the front and side walls of the block includes a filling of insulating material.

6. A module as claimed in claim 5 in which said filling material is a foamed refractory and insulating material.

7. A module as claimed in claim 5 in which the filling is ceramic fibre blanket.

8. A module as claimed in claim 5, wherein the filling is a loose bulk ceramic fibre.

9. A module as claimed in claim 1 including a back wall which is formed separately from the block and which is spaced from the front wall of the block and secured to the side walls thereof.

10. A module as claimed in claim 9 in which the back wall is located on a step formed in the side walls.

11. A module as claimed in claim 9 in which additional refractory and insulating material is disposed in the hollow between the front and back walls.

12. A module as claimed in claim 11, in which the additional material is a foamed material.

13. A module as claimed in claim 11 in which the additional material is in particulate form.

14. A module as claimed in claim 11 in which the additional material is in the form of a plurality of inter-layers which extend between the side walls parallel with the front wall and divide the space between the front and back walls into a plurality of air spaces.

15. A module as claimed in claim 14 in which at least one air space has an in-fill of refractory and insulating material.

16. A module as claimed in claim 14 in which at least one inter-layer includes material resistant to transmission of radiant heat.

17. A module as claimed in claim 14 in which each inter-layer is located by fillets secured on the side walls.

18. A module as claimed in claim 14 in which each inter-layers is located on a step formed in the side walls.

19. A module as claimed in claim 11, in which the additional material is in the form of an inter-layer which extends between the side walls parallel with the front wall and divides the space between the front and back walls into two air spaces.

20. A module as claimed in claim 19, in which one air space has an in-fill of refractory and insulating material.

21. A module as claimed in claim 19, in which the inter-layer includes material resistant to transmission of radiant heat.

22. A module as claimed in claim 19, in which the inter-layer is located by fillets secured on the side walls.

23. A module as claimed in claim 19, in which the inter-layer is located on a step formed in the side walls.

24. A refractory and insulating module comprising a block moulded in one piece from ceramic fibre and having a front wall the front face of which constitutes the hot face of the module, and side walls which with the front wall form a rearwardly open cavity and which have their outer side surfaces inclined inwardly from front to back of the block, the front wall having a lesser density at its front face than at its rear face, at least one layer of a refractory and insulating material located in said cavity and extending parallel to said front wall of the block, a second block made from a refractory material of lower grade than the first said block and secured to the back of the first said block, and two adjacent side faces of the composite structure formed by the first and second blocks having secured thereto a layer of an insulating fabric which is compressible in thickness.

* * * * *